United States Patent [19]

Freeman

[11] Patent Number: 4,724,115
[45] Date of Patent: Feb. 9, 1988

[54] METHOD OF FORMING COMPOSITE STRUCTURES HAVING SECTIONS EXTENDING IN DIFFERENT DIECTIONS

[75] Inventor: Richard B. Freeman, Wilmington, Del.

[73] Assignee: The Budd Company, Troy, Mich.

[21] Appl. No.: 854,235

[22] Filed: Apr. 21, 1986

[51] Int. Cl.⁴ .................. B29C 45/00; B29C 45/14; B29C 45/16
[52] U.S. Cl. .................. 264/513; 264/314; 264/516; 425/812
[58] Field of Search .......... 264/314, 512, 516, 513; 425/503, 812

[56] References Cited

U.S. PATENT DOCUMENTS

| | | | |
|---|---|---|---|
| 4,002,707 | 1/1977 | Oram | 264/314 |
| 4,153,656 | 5/1979 | Bunyan | 264/314 |
| 4,314,964 | 2/1982 | Ferray | 264/513 |
| 4,560,523 | 12/1985 | Plumley et al. | 264/314 |

FOREIGN PATENT DOCUMENTS 1354283  10/1964  France .

*Primary Examiner*—Jan H. Silbaugh
*Assistant Examiner*—Jeremiah F. Durkin, II
*Attorney, Agent, or Firm*—E. M. Farrell; H. Foster; T. I. Davenport

[57] ABSTRACT

A resin transfer molding system and method provides for injecting resin into fibrous material disposed on the inner surfaces of a pair of mold pieces. The mold pieces are shaped to form a structure with two sections which extend in at least two different planes. An inflatible member in one of the sections forces a second pre-inflated member into the second section prior to the injection of resin into the fibrous material.

6 Claims, 3 Drawing Figures

METHOD OF FORMING COMPOSITE STRUCTURES HAVING SECTIONS EXTENDING IN DIFFERENT DIECTIONS

BACKGROUND OF THE INVENTION

In copending patent applications, Ser. No. 768,259, filed Aug. 22, 1985, and Ser. No. 833,304, filed Feb. 26, 1986 assigned to the same assignee as the present application, there are described methods of forming hollow fiber reinforced structures. The methods include impregnating fiber material while utilizing an inflatible bladder. This present application utilizes many of the steps described in the copending applications, and involves an improvement in such methods.

The aforementioned applications involve so-called resin transfer molding (RTM). In these copending applications, resin is applied to fiber material disposed between upper and lower mold pieces, with an inflatible bladder occupying a hollow area of the structures being formed.

The above applications are directed to forming structures in the same plane. However, in some applications, it is desirable to have portions of structures in one plane integrally connected to portions of structures extending in different planes. For example, in an automobile space or sub-frame, lateral roof beams between the side frames are sometimes required. Such lateral beams and other elements generally extend laterally from the side frames and at right angles thereto. It is desirable that these extending elements or sections be integral with the side frames.

OBJECTS OF THE INVENTION

It is an object of this invention to provide an improved resin transfer molding system and method.

It is a further object of this invention to provide an improved resin transfer molding system and method in which the sections formed extend in different directions and are made integral with each other.

It is still a further object of this invention to provide an improved resin transfer molding system and method in which the formation of different extending sections of an integral automotive underframe may be formed.

BRIEF SUMMARY OF THE INVENTION

In accordance with the present invention, resin is applied to a fabric or other reinforcing material disposed between upper and lower mold pieces to form an integral structural member. The structural member may include a complete side frame of an automotive structure, for example, integrally connected to a laterally extending portion of a beam, which may be a roof beam for example, leading to an opposite side frame of the automotive structure sub or space frame.

Other objects and advantages of the present invention will be apparent and suggest themselves to those skilled in the art, from a reading of the following specification and claims, taken in conjunction with the accompanying drawings.

DESCRIPTION OF THE INVENTION

The present invention will be described in connection with the embodiment illustrated in FIGS. 1, 2 and 3. The invention is directed toward providing an integral structure formed by RTM in which sections extend in different directions. In describing the invention, many of the features disclosed and claimed in the aforementioned patent applications will be discussed. The mold including the upper and lower mold pieces will receive the reinforcement or fabric therein to be impregnated as described in the aforementioned applications and details relating thereto will not be described in detail.

Figure 1:
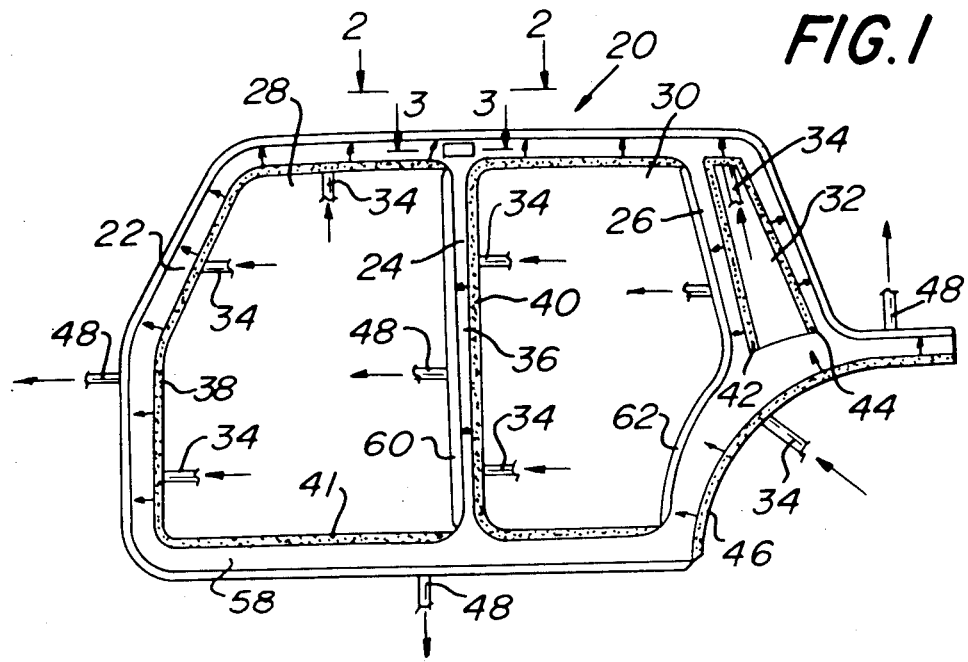
FIG. 1 is a side view, partly broken away, of an automotive side frame structure, of the type which may be formed using the present invention.

Referring to FIG. 1, an automobile under frame structure 20 is illustrated. The sub or space frame structure includes front post 22, center post 24 and rear post 26. The frame is designed to provide door openings 28 and 30 and a window opening 32.

Reference is made to the previously mentioned copending application, Ser. No. 833,304, filed Feb. 26, 1986. In this application, a portion of an automobile sub frame structure is illustrated which forms part of a door frame for an automobile. The sub frame structure may include various joints, curved surfaces and areas of irregular cross-sections. A singular integral cured structure is formed from several prelocated, but unimpregnated, fiber pieces which are placed between upper and lower mold pieces and subsequently injected with resin. The impregnated fiber pieces are then suitably molded and cured. The structure 20 illustrated includes a hollow area extending therethrough.

A source of resin is connected to a plurality of inlet ports 34 to impregnate the fiber or other reinforcement material 36 which ultimately forms the rigid sub frame structure 20. Between the resin inlet ports 34 and the fibrous material 36, there are provided a plurality of channels or reservoirs 38, 40, 41, 42, 44 and 46 which actually are in either the upper or lower mold piece. The grooves or reservoirs are disposed adjacent the fibrous material 36. The channels or reservoirs are disposed to receive the resin from the inlet ports 34, which are connected to a resin source, not illustrated.

When the resin is applied under pressure, the fibrous material 36 is impregnated with the resin. A plurality of air vents 48 is provided to vent the air as the resin is injected into the fibrous material 36. Vent groove or channel 58 is disposed about the periphery of the frame, vent groove 60 is disposed at the center post 24, and vent groove 62 is disposed at the end post 26 to facilitate the venting of the air vents 48. The vent grooves or channels form parts of the upper or lower mold in the system.

Up to this point, the structure and method described is related to the copending application, Ser. No. 833,304 filed Feb. 26, 1986. The present invention to be emphasized in FIGS. 2 and 3 relates to providing a laterally extending integral beam from the structure 20, to eventually provide connecting means to an opposite side frame structure.

Figure 2:
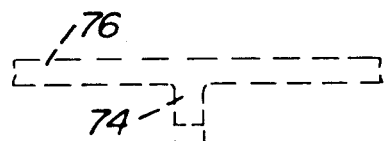
FIG. 2 is a view, taken along lines 2—2 of FIG. 1 illustrating generally a roof beam structure connected between two side frames of an automotive structure.

Referring to FIG. 2, a top view of an automotive structure formed, includes a side underframe structure 20, as illustrated in FIG. 1, and an extending section or portion 70, integrally connected to the structure 20. The manner in which the section 70 is connected to the structure 20 will be described in connection with FIG. 3. The present invention contemplates a connection of a roof beam 72 connected from extending section 70 to a second extending section 74 connected to a second side frame structure 76.

Figure 3:
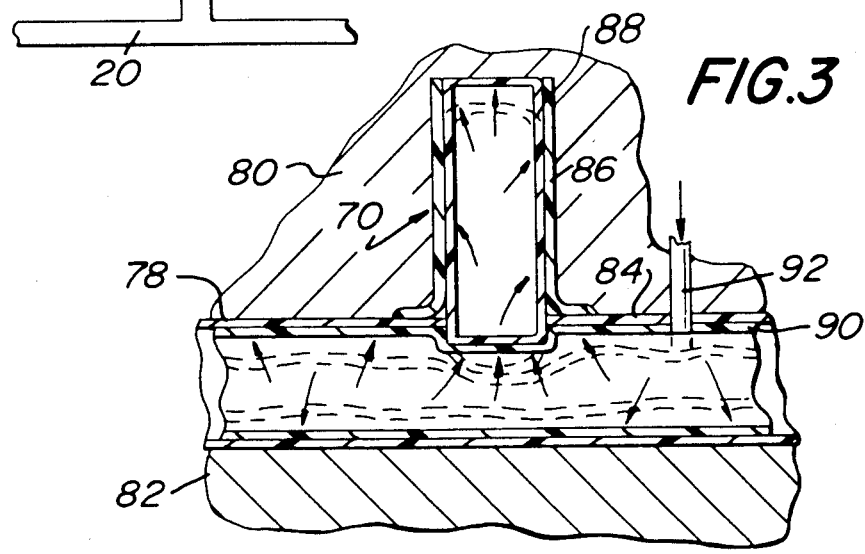
FIG. 3 is a cross sectional view taken along lines 3—3 of FIG. 1.

Referring to FIG. 3, a top section 78 of the structure 20 (FIG. 1), which may be part of the roof frame of an automotive structure, is disposed to be integrally attached to an "ear" or cross-member section 70 (FIG. 2). This requires several preliminary steps to be taken.

The pieces or sections of fabric 86, or other reinforcement material, must be prelocated within the upper mold piece 80 and lower mold 82. These pieces form an integral piece after the RTM operation. The upper and lower reinforcements inside the mold, as well as the crossmember attachment "ears" must be preformed. The reinforcement used in the layup has a thermoplastic binder on it which allows the material to be shaped by heat and pressure. The precut shapes which form a complete charge are either individually or collectively thermoformed to form the configuration charge.

In the present embodiment, fabric pieces 84 and 86 (each of which may comprise a plurality of pieces) is assembled inside the mold pieces 80 and 82. A bag 88 and any localized reinforcement is also inserted into the mold. If localized metal reinforcement is required, which should be primed, it should be properly located and could be held in place by a layer of continuous strand mat over it. The mat may have thermoplastic binder which secures the metal reinforcement. Currently, however, additional glass is considered sufficient for most areas where metal inserts would be considered. Such metal reinforcements are not illustrated.

The bag 88 may be a disposable polyethylene or other suitable material flat tubing which when inflated takes the shape of the mold. However, the bag is made from a blow molded material in some cases. The bag 88 is preinflated.

The mold pieces 80 and 82 are first sprayed with release agent. This is a quick operation since the mold is heated and any solvent flashes off instantly. The crossmember attachment "ear" 70 is then loaded in the mold, each as a preformed reinforcement charge with a core consisting of a pre-made "pillow" or bag 88 which is preinflated and extends partly into the cavity of the main frame 78 before a main bag 90 is inflated. The bag 90 is normally put into the mold in a deflated condition. This condition is illustrated by the dotted lines of the bags 88 and 90 in FIG. 3, with the solid lines representing the final positions of the bags prior to injection of the resin. The inflatible bag 90, which is inserted into the mold in the deflated condition and then inflated by a source of suitable gas through an inlet port 92, as described in the aforementioned applications. When bag 90 inflates, it pushes against the inflated pillow or bag 88 causing it to extend into the ear or cross member 70 against the reinforcement 86 and takes the shape of the interior of member 70. The bag 90, if it is a lay flat tubing, has to be sized by the largest internal perimeter of the section 78. It is then sealed at one end and looped around the frame. Two bags in one section of the frame should not cause a problem. The bags will then exit the mold at the trunk crossmember for quick attachment to an air inlet. The pillow 88 is partly inflated and sealed at both ends prior to insertion into the section 70.

What is claimed is:

1. A method of forming a rigid reinforced structure having first and second sections extending in different directions comprising the steps of:
    (a) providing an outer mold with reinforcement material therein and including two mold pieces with one of said pieces having first and second portions extending in different planes for forming said first and second sections;
    (b) placing an inflatible member in contact with said reinforcement material in the first of said portions;
    (c) placing an inflated member in the second of said portions extending from said second portion into said first portion in contact with the reinforcement material within said first portion;
    (d) inflating said inflatible member against said inflated member to force said inflated member into said second portion and conforming said members to said portions;
    (e) injecting resin into said reinforcement material in both of said first and second portions, and
    (g) curing said reinforcement material to form rigid reinforced structure.

2. A method as set forth in claim 1 wherein an additional step includes providing a mold including two mold pieces with one of said pieces including a portion extending in a different direction than the other piece.

3. A method as set forth in claim 2 wherein an additional step includes placing said reinforcement material along the inner walls of said mold pieces.

4. A method as set forth in claim 3 wherein the additional step is provided of placing said inflatible member in said first portion when said inflatible member is in a deflated condition.

5. A method as set forth in claim 4 wherein channels are provided in one of said mold pieces to receive said resin.

6. A method as set forth in claim 5 wherein second channels are provided in one of said mold pieces to vent air as resin is being injected into said reinforcement material.

* * * * *